United States Patent
Lin

(10) Patent No.: US 12,483,431 B2
(45) Date of Patent: Nov. 25, 2025

(54) SHARING SERVICE ENCRYPTION SYSTEM AND APPARATUS THEREOF

(71) Applicant: Jin-Cheng Lin, Taipei (TW)

(72) Inventor: Jin-Cheng Lin, Taipei (TW)

( * ) Notice: Subject to any disclaimer, the term of this patent is extended or adjusted under 35 U.S.C. 154(b) by 370 days.

(21) Appl. No.: 18/140,560

(22) Filed: Apr. 27, 2023

(65) Prior Publication Data

US 2024/0097921 A1 Mar. 21, 2024

(30) Foreign Application Priority Data

Sep. 19, 2022 (TW) .................................. 111135307

(51) Int. Cl.
*H04L 9/32* (2006.01)
*H04L 9/08* (2006.01)
*H04L 29/06* (2006.01)

(52) U.S. Cl.
CPC .......... *H04L 9/3278* (2013.01); *H04L 9/0825* (2013.01); *H04L 9/085* (2013.01); *H04L 9/3247* (2013.01)

(58) Field of Classification Search
CPC ..... H04L 9/3278; H04L 9/0825; H04L 9/085; H04L 9/3247; H04L 9/32; H04L 9/3271; H04L 9/30
See application file for complete search history.

(56) References Cited

U.S. PATENT DOCUMENTS

| | | | |
|---|---|---|---|
| 2013/0243187 A1* | 9/2013 | Horstmeyer | G09C 1/00 380/28 |
| 2017/0139795 A1* | 5/2017 | Komano | H04L 63/1425 |
| 2020/0213287 A1* | 7/2020 | Zhang | H04L 63/123 |

* cited by examiner

*Primary Examiner* — Edward Zee
(74) *Attorney, Agent, or Firm* — Anna Tsang

(57) ABSTRACT

A sharing service encryption system, including: a verification unit, verifying identity information and a physical unclonable function, from at least one of a user, a logistics package and a mobile vehicle, to accordingly generate verification information; and a sharing resource determination unit, determining an operable range of at least one of the user, the logistics package and the mobile vehicle to be effective in the sharing resource, based on the verification information.

8 Claims, 7 Drawing Sheets

SHARING SERVICE ENCRYPTION SYSTEM AND APPARATUS THEREOF

CROSS REFERENCE

The present invention claims priority to TW 111135307, filed on Sep. 19, 2022.

BACKGROUND OF THE INVENTION

Field of Invention

The present invention provides a sharing service encryption system and device, which are particularly related to a sharing service encryption technique with a high security level by means of a physical unclonable function.

Description of Related Art

In the trend of eco protection and lower power consumption, the sharing economy is becoming more popular and versatile, and its related applications are gradually integrated into daily life activities. The sharing economy subjects, such as sharing bicycle, sharing office, and sharing space, have gradually become living style options. For example, how to effectively manage the sharing service to fit in users' identical habits and needs, is very important. Furthermore, in order to access to sharing service activities, some people may pretend to be others or imitate others' vehicles for unlawful purpose, which may cause losses and violations of the law.

In addition, some logistics systems may suffer by unlawful acts, such as unpermitted package switching or stealing packages during transportation. One possible reason for causing these criminals is: the contents inside the package are clearly marked on the outside of the package, such that the one with theft motive can easily find his/her target. Further, in the current logistics system, each package is handled independently, which make the management of logistics, information and warehousing to be very resource-intensive and error-prone.

In view of the above problems, a secure sharing service encryption system capable of providing highly secure and reliable service is very important.

SUMMARY OF THE INVENTION

To the technical problems above-mentioned, one of the objects of the present invention are to provide a sharing service encryption system and device thereof, which include: a verification unit, verifying identity information and a physical unclonable function, to accordingly generate verification information based on the verifying result, wherein the identity information and the physical unclonable function are obtained from at least one of a user, a logistics package, and a mobile vehicle; and a sharing resource determination unit, determining an operable range of at least one of the user, the logistics package and the mobile vehicle, to be effective in a sharing resource, based on the verification information.

In one embodiment, the identity information is encrypted by asymmetric encryption, wherein the sharing service encryption device provides a public key for the asymmetric encryption.

In one embodiment, a current private key is generated based on the physical unclonable function in the sharing service encryption device, and a private key tracking information of the current private key generated with reference to an initial private key. The initial private key is restored based on the current private key and the private key tracking information, and the public key is generated based on the initial private key.

In one embodiment, the sharing service encryption device generates a secret key based on the physical unclonable function of the at least one of the user, the logistics package and the mobile vehicle, or based on a physical unclonable function in the sharing service encryption device. The public key of the asymmetric cryptography may be encrypted by the secret key. In this embodiment, this multi-step encryption can greatly increase the difficulty of decrypting the public key.

In one embodiment, the digital signature of the identity information may be generated based on the physical unclonable function of the at least one of the user, the logistics package and the mobile vehicle. Or, a symmetric encryption password for encrypting the identity information may be generated based on the physical unclonable function of the at least one of the user, the logistics package and the mobile vehicle. Or, the physical unclonable function of the at least one of the user, the logistics package and the mobile vehicle, may be encrypted for safety purpose.

In one embodiment, after the sharing resource determination unit generates the determination information, the system (or the sharing resource determination unit in the system) provides the at least one of the user, the logistics package and the mobile vehicle, permission to use the sharing resource based on the determination information. In one embodiment, the system determines the operable range of the user, the logistics package and the mobile vehicle, to be effective in the sharing resources, based on the identity information generated by the physical unclonable function of at least two of the user, the logistics package and the mobile vehicle (or, based on the verification information generated according to the physical unclonable functions of the at least two of the user, the logistics package and the mobile vehicle).

In one embodiment, the mobile vehicle mainly includes: car, locomotive, bicycle, boat, or aircraft.

The system determines the at least one of the user, the logistics package and the mobile vehicle, to be available in the operable range of the sharing resource based on the verification information. In one embodiment, the sharing resource includes: sharing space, sharing support service, sharing facility, sharing mobile carrier, or sharing logistics. For example, the sharing service encryption system can determine whether the sharing mobile carrier can be available for the user, based on the verification information described above.

In one embodiment, the transmission of the identity information, the verification information, and the public key in the asymmetric encryption, may be operated by wireless, wired, or other transmission method.

In one embodiment, the sharing resource includes a parking space, wherein the verification unit includes at least one wireless authentication unit to be located in the parking space, to verify whether the user (or the mobile vehicle) can use the parking space or not, by means of wireless signals. The sharing resource determination unit includes a smart parking bollard or a smart parking ground seat (including a function similar to the smart parking bollard, the smart parking ground seat installed on the parking space ground to detect the vehicle) to determine whether the user or the mobile vehicle is parked in the parking space. The sharing resource determination unit is used to determine the operable range of the user or the mobile vehicle to be effective in the parking space.

In one embodiment, the sharing resource includes a sharing logistics. The verification unit verifies whether the logistics package is a logistics delivery object permitted for the sharing logistics, and the sharing resource determination unit further determines whether the operable range of the logistics package includes at least one of delivery service, and packing/unpacking service.

In one embodiment, when the sharing resource has a damaged state, or the user accessing to the sharing service encryption system has a vandal behavior record, the sharing resource can enter a secure mode or a monitoring guidance mode to limit or guide the use in using the sharing resource.

In one embodiment, a proficiency level the user accessing to the sharing service encryption system at least includes a beginner user or an advanced user.

In one embodiment, the verification information of the user, the logistics package, and the mobile vehicle may have an information connection with an internal system, a government platform, or a public communication platform. In one embodiment, the sharing service encryption device, further includes: a detention mode or a denial mode, wherein when the user has a potential security concern or the mobile vehicle has a potential function concern or a potential ownership concern, the sharing service encryption device activates the detention mode to hold the mobile vehicle, or activates the denial mode to prohibit the user or the mobile vehicle from using the sharing resource.

In one embodiment, a physical unclonable function may be generated based on an electronic ID card chip, digital signature chip, hidden electronic device, security chip, or other devices.

In one perspective, the present invention provides a sharing service encryption system, which includes: a user verification unit, verifying a user based on a physical unclonable function and identity information of the user, to generate user verification information based on the verifying result; a package verification unit, verifying a logistics package based on a physical unclonable function and identity information of the logistics package, to generate logistics verification information based on the verifying result of the logistics package; a vehicle verification unit, verifying a physical unclonable function and identity information of a mobile vehicle, to generate vehicle verification information based on the verifying result of the mobile vehicle; and a sharing resource determination unit, determining an operable range of at least one of the user, the logistics package and the mobile vehicle, to be effective in a sharing resource, based on at least one of the user verification information, the logistics verification information and the vehicle verification information.

For better understanding the above and other aspects of the present invention, the detailed description of the embodiments and the accompanying drawings are provided as follows.

DESCRIPTION OF THE PREFERRED EMBODIMENTS

The objectives, technical details, features, and effects of the present invention will be better understood with regard to the further detailed description of the embodiments below, with reference to the drawings. Obviously, the described embodiments are only a part of the present invention, rather than all.

Figure 1:
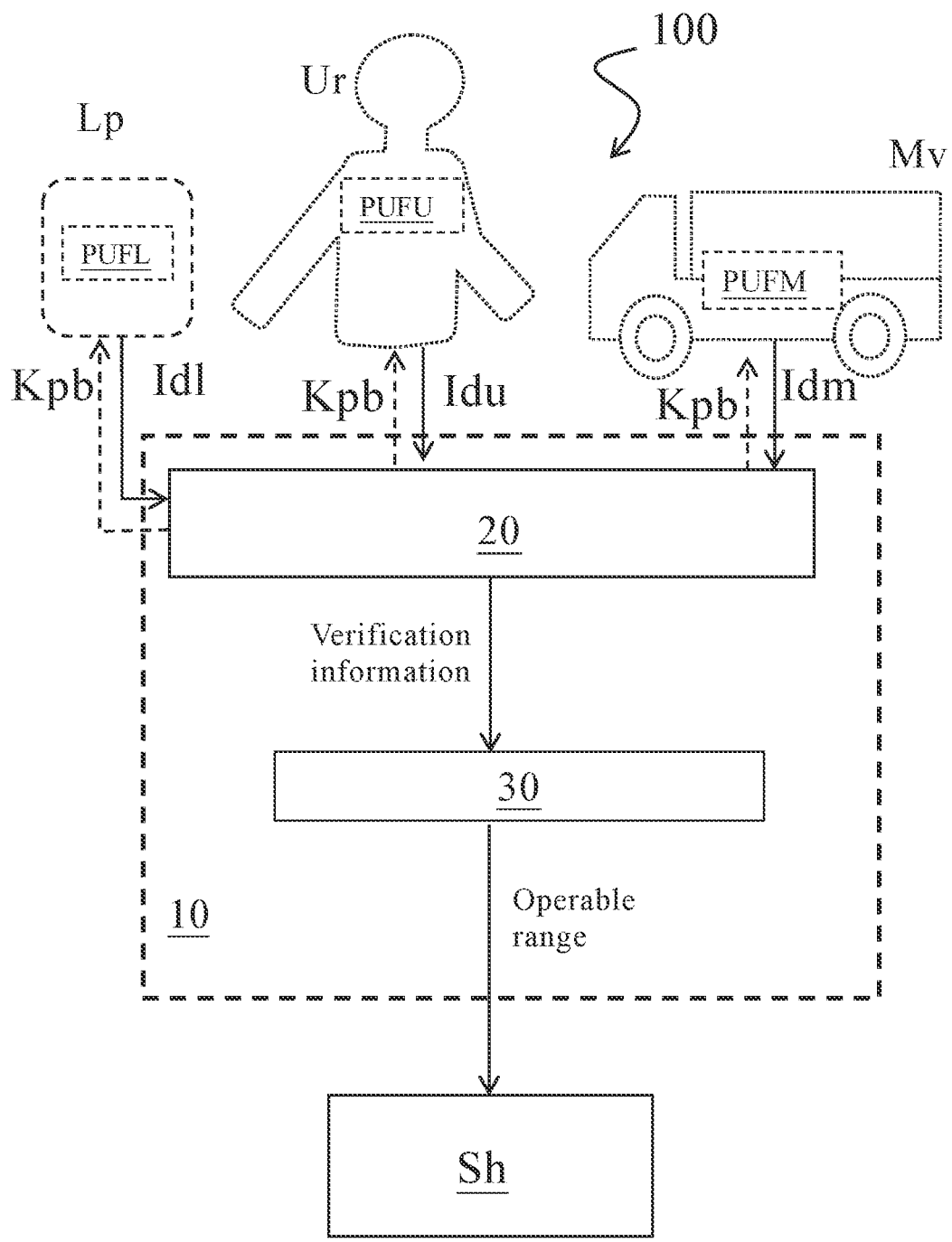
FIG. 1 shows a schematic diagram of a sharing service encryption system according to one embodiment of the present invention.

Referring to FIG. 1, the present invention provides a sharing service encryption system 100, which includes: a sharing service encryption device 10, including a verification unit 20, verifying identity information (Idu, Idl or Idm) and a physical unclonable function (PUFU, PUFL or PUFM), to generate verification information based on the verifying result, wherein the identity information (Idu, Idl or Idm) and the physical unclonable function (PUFU, PUFL or PUFM) are obtained from at least one of a user Ur, a logistics package Lp and a mobile vehicle Mv; and a sharing resource determination unit 30, determining an operable range of at least one of the user Ur, the logistics package Lp and the mobile vehicle Mv, to be effective in a sharing resource, based on the verification information. At least one of the user Ur, the logistics package Lp and the mobile vehicle Mv, is permitted in the operable range of the sharing resource Sh. The physical unclonable functions (PUFU, PUFL, PUFM) of the user Ur, the logistics package Lp and the mobile vehicle Mv, may be the key to ensure the operational security of the system.

The aforementioned physical unclonable functions PUFU, PUFL, PUFM (or physical unclonable function in a sharing service encryption device 10) may be used for encryption, digital signature, or authentication purpose. The physical unclonable function is an inherent property that occurs naturally during the manufacturing process of the component, regardless of which kind of the information stored in the device. The component may belong to at least one of the components in the user Ur, the logistics package Lp, the mobile vehicle Mv, or any component in the sharing service encryption system 100. In one example, a driver (user Ur) drives a vehicle (mobile vehicle Mv) to find a parking space. The system uses the identity information generated by PUFU and PUFM as a basis to determine whether the user Ur and the mobile vehicle Mv have the verification information corresponding to the sharing resource Sh (e.g. parking space). When the sharing resource determination unit 30 generates the determination information corresponding to the sharing resource Sh, the system determines whether the user Ur or the mobile vehicle Mv can access to the sharing resource Sh, and determines the operable range according to the determination information. The operable range of the sharing resource Sh, determined by the verification information of both the user Ur and the mobile vehicle Mv, is very safe such that it is difficult to obtain access to the system by means of cheating or disguise, for illegally using of the sharing resource Sh. Thus, the combined verification of the user Ur, the logistics package Lp and mobile vehicle Mv, can discriminate many non-compliant or illegal uses in advance. For example, when a user's verification information does not correspond to the permitted user of the mobile vehicle Mv stored in the system, the mobile vehicle Mv may be owned by theft or alteration. The physical unclonable function of the mobile vehicle Mv, PUFM, cannot be modified by means of changing the vehicle license plate, or changing the corresponding verification information. In this way, the system can further secure the identity information Idu and Idm generated by the PUFU and PUFM according to the physical unclonable function of the user Ur or the mobile vehicle Mv. The generated identity information Idu, Idm according to the physical unclonable function, is difficult to disguise or alter, thus the operational security of the system is highly secured. In one embodiment, the system can generate verification information according to the physical unclonable functions of the user Ur, the mobile vehicle Mv and the sharing resource Sh. The security in this embodiment, is very high so that it is difficult to unlock the system by sniffing the asymmetric encryption technology of the present invention. The asymmetric encryption increases security by separating the public key from the private key, wherein the public key is used for the encryption and the private key is used for the decryption, respectively. The private key may be generated based on the physical unclonable function, and the public key is generated based on the private key. In addition to the sharing service, the invention also provides a highly safe authentication capability to protect the permitted users.

In one embodiment, in one example that a staff (the user Ur) drives a vehicle (the mobile vehicle Mv) for transmitting goods (logistics package Lp), the system uses the identity information generated according to the physical unclonable functions PUFU, PUFL, PUFM of the user Ur, the logistics package Lp and the mobile vehicle Mv, to determine whether the user Ur, the logistics package Lp and the mobile vehicle Mv have the verification information corresponding to the sharing resources Sh (parking space and sharing logistics). The operable range of the sharing resource Sh (the parking space or the sharing logistics) may be determined according to the verification of information of two of the user Ur, the logistics package Lp and the mobile vehicle Mv. It is even possible to store the content information of goods in the system or the device by using the identification and authentication technology of the present invention, so that the contents of goods in the logistics process do not have to be disclosed on the package or the packing list, to reduce the risk of prying and theft.

The physical unclonable function and the identity information may be primarily used to authenticate the access to the system, or in combination with other methods of authentication (e.g. password login followed by authentication). In this invention, either way of accessing the system is highly secure.

In one embodiment, the verification of the sharing service encryption system 100 is based on at least one of the physical unclonable functions PUFU, PUFL and PUFM respectively of the user Ur, the logistics package Lp, and the mobile vehicle Mv. For example, the system verifies an auto-pilot vehicle entering a parking space, mainly according to the physical unclonable function PUFM and the identity information Idm of the mobile vehicle Mv. In one embodiment, the system provides permission to the user Ur to access to the sharing resource Sh, when the sharing resource determination unit 30 generates determination information corresponding to the user Ur; or, when the sharing resource determination unit 30 generates determination information corresponding to mobile vehicle Mv, the system provides permission to the mobile vehicle Mv to access to the sharing resource Sh; or, when the sharing resource determination unit 30 generates determination information related to the user Ur, the logistics package Lp and the mobile vehicle Mv, the system determines the user Ur, the logistics package Lp and the mobile vehicle Mv to use the sharing resource Sh based on the determination information.

In one embodiment, the sharing service encryption system 100 has the sharing service encryption device 10 determining the operable range of the user Ur, the logistics package Lp and the mobile vehicle Mv to be effective in the sharing resource Sh, based on the physical unclonable function of PUFU, PUFL and PUFM of the user Ur, the logistics package Lp and the mobile vehicle Mv, as well as the physical unclonable function of the sharing resource Sh. The applied encryption technology in the present invention may be symmetric or asymmetric, which is detailed in other embodiments.

In one embodiment, the identity information Idu, Idl or Idm is encrypted by the asymmetric encryption, and the sharing service encryption device 10 provides a public key Kpb, to encrypt identity information Idu, Idl, or Idm. In one embodiment, at least one of the physical unclonable functions PUFU, PUFL and PUFM respectively of the user Ur, the logistics package Lp and the mobile vehicle Mv, may be combined with the identity information Idu, Idl, or Idm encrypted by the aforementioned public key Kpb, in a formation of digital signature.

As mentioned above, the physical unclonable function is an inherent characteristic that occurs naturally during the manufacturing process in a component, and the physical unclonable function can partially change due to aging, long-term use, or other causes. Thus, the private key generated by the physical unclonable function and the public key generated by the private key, may correspondingly change, may also change, which may result in unsuccessful encryption or decryption. To this problem, in one embodiment example, a physical unclonable function in the sharing service encryption device 10, may be used to generate a current private key and a private key tracking information of the current private key in correspondence with an initial private key. The initial private key may be generated based on an initial physical unclonable function in the sharing service encryption device 10. The sharing service encryption system 100 (or the sharing service encryption device 10) can restore the initial private key based on the current private key and the private key tracking information, and generate a public key corresponding to the initial private key. In one embodiment example, the physical unclonable function within the sharing service encryption system 100 may be used to generate a public key corresponding to the initial private key. The physical unclonable function may be obtained from any component in the sharing service encryption device 10. In this approach, even if the private key is affected by aging or other factors, the system can track back the initial private key based on the private key tracking information and the subsequently generated private key, for encryption and decryption purposes.

With reference to FIG. 1, in one embodiment, the digital signature of the identity information Idu, Idl or Idm, is generated based on the at least one of the physical unclonable functions PUFU, PUFL and PUFM respectively of the user Ur, the logistics package Lp and the mobile vehicle Mv. Or, the password for the symmetric encryption of the identity information Idu, Idl or Idm, is generated based on the at least one of the physical unclonable functions PUFU, PUFL and PUFM respectively of the user Ur, the logistics package Lp and the mobile vehicle Mv. The symmetric encryption password may be encrypted by the public key Kpb and transmitted to the sharing service encryption system 100.

In one embodiment, when the sharing resource determination unit 30 generates the determination information, the system can provide permission to the at least one of the user Ur, the logistics package Lp and the mobile vehicle Mv, based on the determination information. In one embodiment, the system determines at least two of the identity information of the user Ur, the logistics package Lp and the mobile vehicle Mv, generated by the physical unclonable functions PUFU, PUFL and PUFM, to have the operable range of the user Ur, the logistics package Lp and the mobile vehicle Mv to be effective in the sharing resource Sh.

In one embodiment, the mobile vehicle Mv mainly includes a car, a motorbike, a bicycle, a boat, or an aircraft. In addition, the mobile vehicle Mv can also include other types of vehicles, such as carousels in an amusement park, roller coasters, etc. In one embodiment, the logistics package Lp mainly includes various types of packaging, such as cargo boxes, sealed bags, pallets, mesh bags, sealing films, and other types of packaging.

Figure 2A:
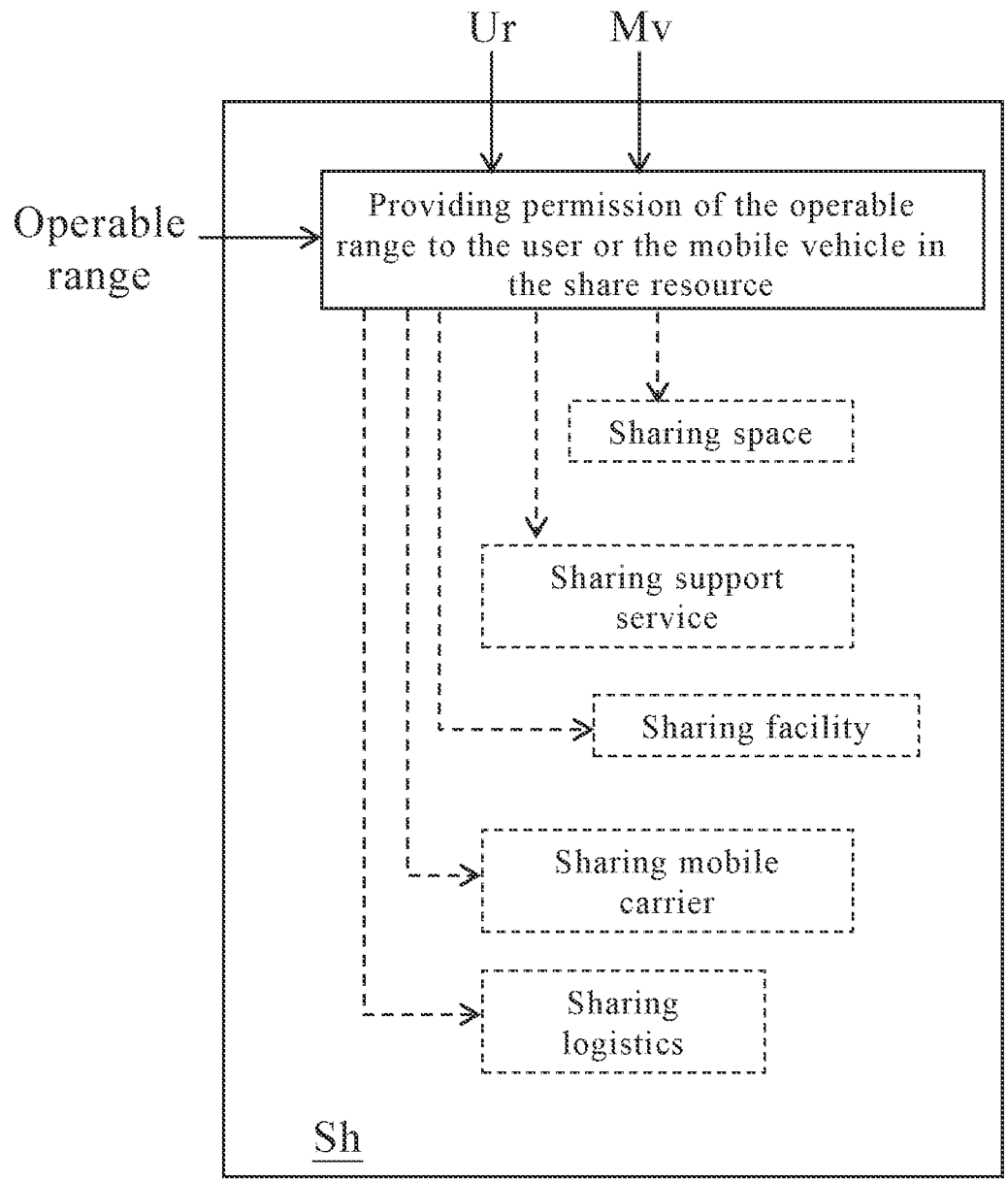
FIGS. 2A, 2B, and 2C show schematic diagrams of sharing resources according to several embodiments of the present invention.
Figure 2B:
Figure 2C:
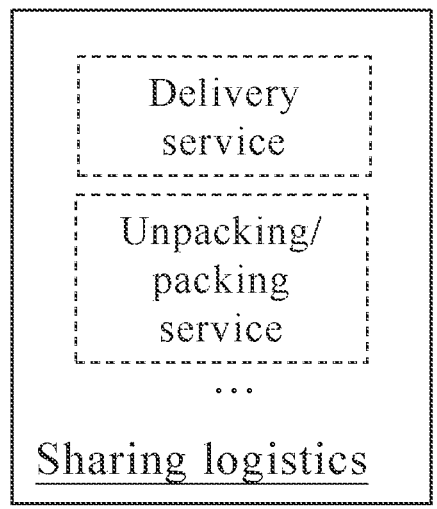

The system determines the operable range of the at least one of the user Ur, the logistics package Lp and the mobile vehicle Mv, to be effective in the sharing resource Sh, based on the verification information. FIG. 2A shows an example of the operable range in the sharing resource Sh, which includes: sharing space, sharing support service, sharing facility, sharing mobile carrier, or sharing logistics. The sharing space includes: meeting room, sanitary facility, guest room, on-street parking space, parking space in building, parking space on ships, etc. The sharing support service includes: catering, communication, postal service, etc. The sharing facility includes: charging post, office facility, warehouse, information facilities, air conditioning facility, sanitary facility, refreshment facility, entertainment facility, etc. In the embodiment shown in FIG. 2B, the sharing logistics includes unpacking/packing, sorting, loading, warehousing, delivery and other logistics services. In the embodiment shown in FIG. 2C, the sharing logistics includes: cross ducking, delivery service, and unpacking/packing service. In short, the sharing service encryption system 100 can use the verification information described above to determine the operable range effective in a sharing resource.

In one embodiment of the sharing resource Sh including the sharing logistics, the user Ur, the logistics package Lp and the mobile vehicle My may have a variety of options for verification and the operable range. For example, when the logistics package Lp is permitted to access to sharing logistics, the logistics package Lp can use the logistics service such as unpacking, sorting, loading, warehousing and distribution (or delivery services and unpacking service for the cross-docking logistics). For example, the user Ur is permitted to use the sharing logistics with the logistics package Lp, wherein the available logistics service may include unpacking, sorting, loading, warehousing and distribution in the sharing logistics (or delivery service and unpacking service for the cross-docking logistics). For example, the user Ur, the logistics package Lp and the mobile vehicle Mv, are permitted to enter the sharing logistics, the mobile vehicle Mv can use the sharing logistics in addition to the aforementioned services of the user Ur and the logistics package Lp. Therefore, the user can have several options on how to implement the present invention according to needs.

In one embodiment, the transmission of identity information Idu, Idl, Idm, the verification information and the public key Kpb of the asymmetric encryption, may be performed by wireless, wired, other electronic transmission means, or deposit and read by a portable storage device.

Figure 3:
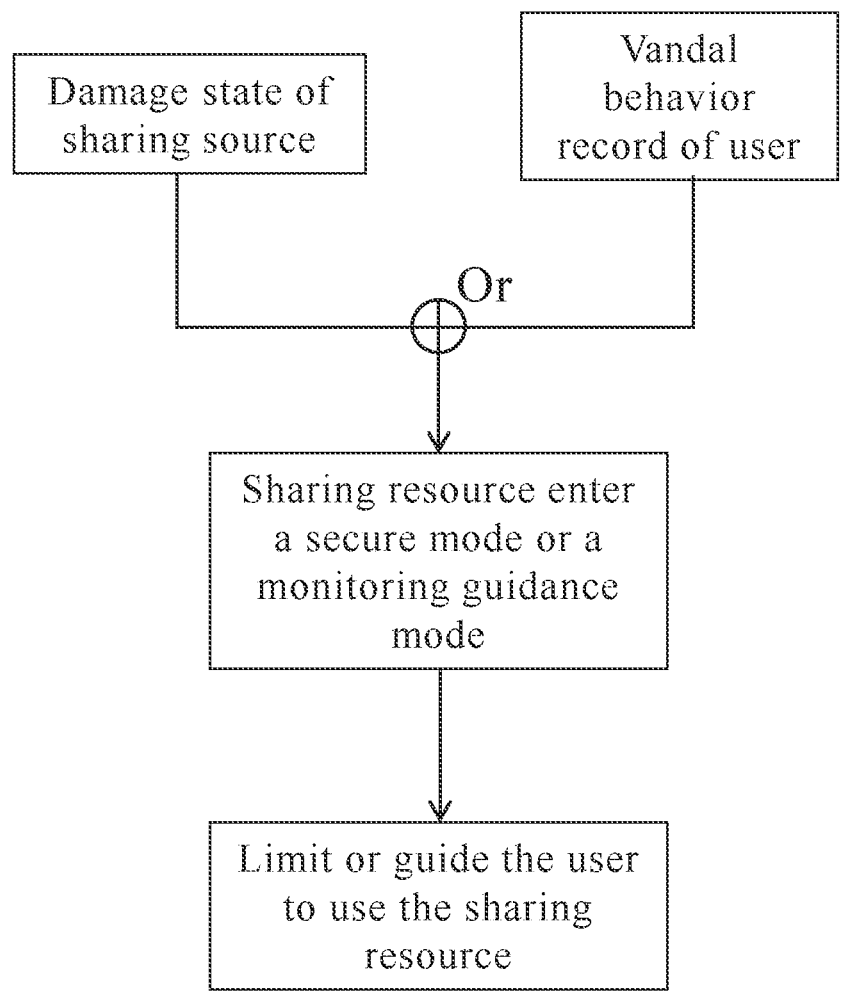
FIG. 3 shows a schematic diagram of the sharing resources and the operation flow of the user according to one embodiment of the present invention.

FIG. 3 shows one embodiment, wherein when a sharing resource Sh has a damage state, or a verified user Ur entering the sharing service encryption system 100 has a vandal behavior record, the sharing resource Sh may enter a secure mode or a monitoring guidance mode, to limit the operable range or guide the user Ur how to use the sharing resource Sh. The secure mode includes: disabling some functions, limiting available human manipulation, etc. The monitoring guidance mode includes: guiding the user Ur to use the sharing service encryption system 100; or, monitoring the user's operation and disabling some functions if the user Ur does not follow the guidance. The aforementioned disabling some functions may include, for example, limiting the physical or chemical operations such as: operations of wireless signals, wired signals, sounds, gestures, fingerprints, facial feature capture, motion, light, etc.

In one embodiment, the sharing service encryption system 100 at least classifies the permitted user proficiency levels, into a beginner user and an advanced user, so as to avoid causing the user Ur to be confused when using the system for the first time, or to misuse the functions and damage them. When the user Ur is the beginner user, the sharing service encryption system 100 provides guidance information to lead the beginner user how to use the sharing resources. When user Ur is the advanced user, the sharing service encryption system 100 provides the advanced user with an operable range that is more than that of the beginner user. The aforementioned more operable range, may be: more options than the operable range of the beginner user, more sharing space, more sharing support service, more sharing facilities, or more sharing mobile carriers, etc.

In one embodiment, the identity information Idu, Idl and Idm of the user Ur, the logistics package Lp and the mobile vehicle Mv, may be connected to an internal system, a government platform, or a public communication platform, to verify individual information and relationships between the user, the logistics package Lp and the mobile vehicle Mv. In this embodiment, the sharing service encryption system includes a detention mode or a denial mode. For example, when there is a security concern (e.g. criminal record, taking dangerous goods, potential function concern, potential ownership concern etc.) related to the user Ur, the logistics package Lp or the mobile vehicle Mv, the sharing service encryption system may be activated into the detention mode. Alternatively, the sharing service encryption system may be activated into the denial mode, to stop the user Ur, the logistics package Lp or the mobile vehicle Mv from accessing to the sharing resource Sh. This implementation may be applied to many cases. For example, when the sharing service Sh includes a parking location of the mobile vehicle Mv in a theft state or a non-payment state, the sharing service encryption system can activate the detention mode to force the mobile vehicle Mv to be held on its parking location until the relevant department agents comes. Or, when the user has a potential security concern, the sharing service encryption system can activate the denial mode to refuse to provide service to the user, for protecting the sharing resource or other users in the sharing resource. In these examples, the sharing service encryption system has co-search and social security functions.

In one embodiment, the physical unclonable function may be generated according to an electronic ID card chip, a digital signature chip, a hidden electronic device, a security chip, or other devices.

Figure 4:
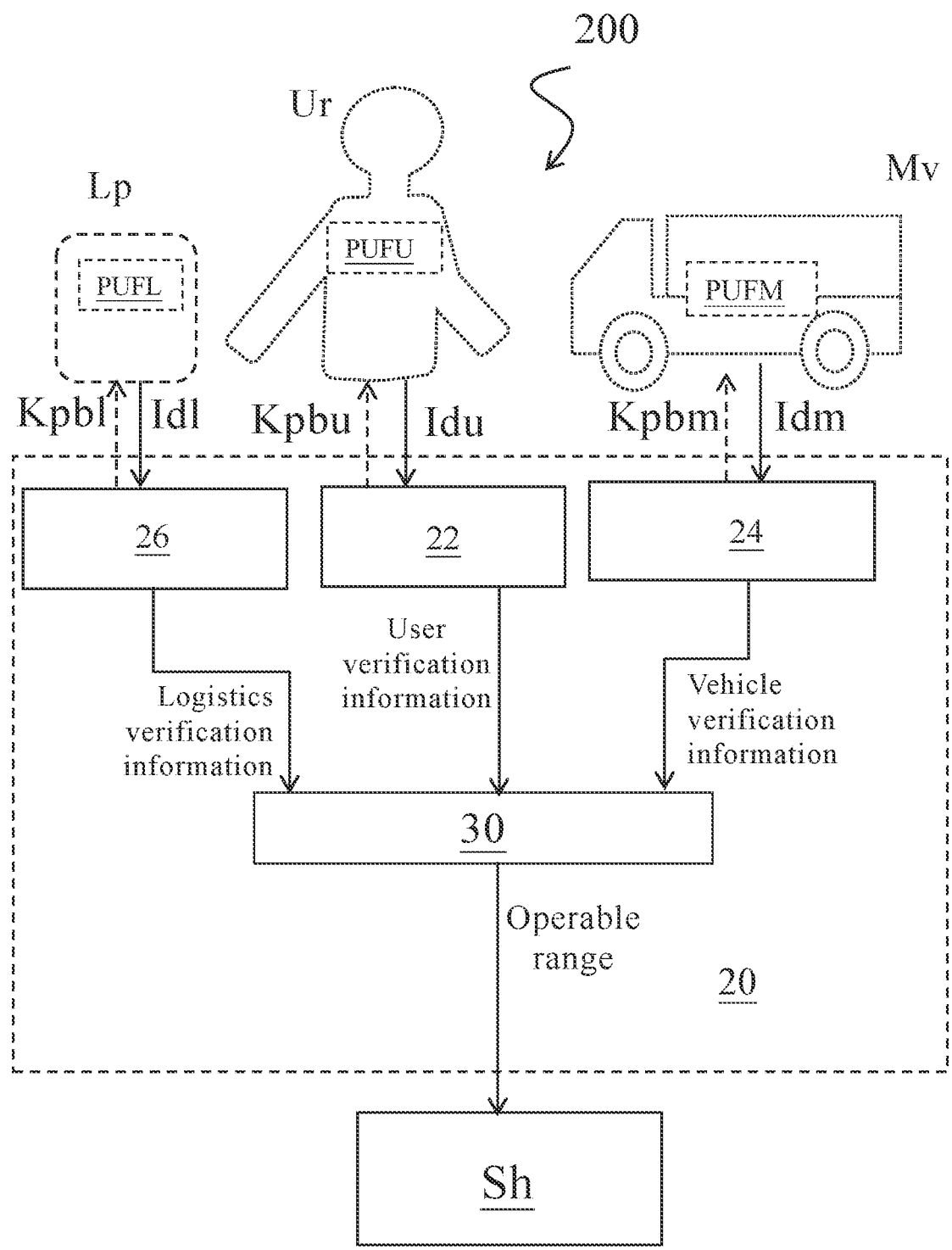
FIGS. 4 and 5 show a schematic diagram of sharing service encryption systems according to two embodiments of the present invention.

According to a perspective as shown in FIG. 4, the present invention provides a sharing service encryption system 200 including: a sharing service encryption device 40, including a user verification unit 22 which verifies a user Ur based on a physical unclonable function PUFU and identity information Idu of the user Ur, to generate user verification information based on the verifying result; a package verification unit 26, which verifies a logistics package Lp based on a physical unclonable function PUFL and identity information Idl of the logistics package Lp, to generate logistics verification information based on the verifying result of logistics package Lp; a vehicle verification unit 24, which verifies a mobile vehicle Mv based on a physical unclonable function PUFM and the identity information Idm of the mobile vehicle Mv, to generate vehicle verification information based on the verifying result; and a sharing resource determination unit 30, which determines an operable range of the user Ur, the logistics package Lp and the mobile vehicle Mv, based on the user verification information, the logistics verification information and the vehicle verification information. The detail regarding to each of the embodiments relating to the sharing service encryption system 200, can be referred to the above embodiments and not be repeated herein.

In one embodiment, the user identity information Idu, the logistics package identity information Idl, and the mobile vehicle identity information Idm, may be respectively encrypted by the asymmetric encryption of the present invention. The sharing service encryption system 200 provides public keys Kpbu, Kpbl and Kpbm, for encrypting the identity information Idu, Idl, and Idm. In another implementation, the physical unclonable functions PUFU, PUFL and PUFM of the user Ur, the logistics package Lp and the mobile vehicle Mv, may be combined with the identity information encrypted in the aforementioned public key Kpb, in a form of a digital signature.

Figure 5:
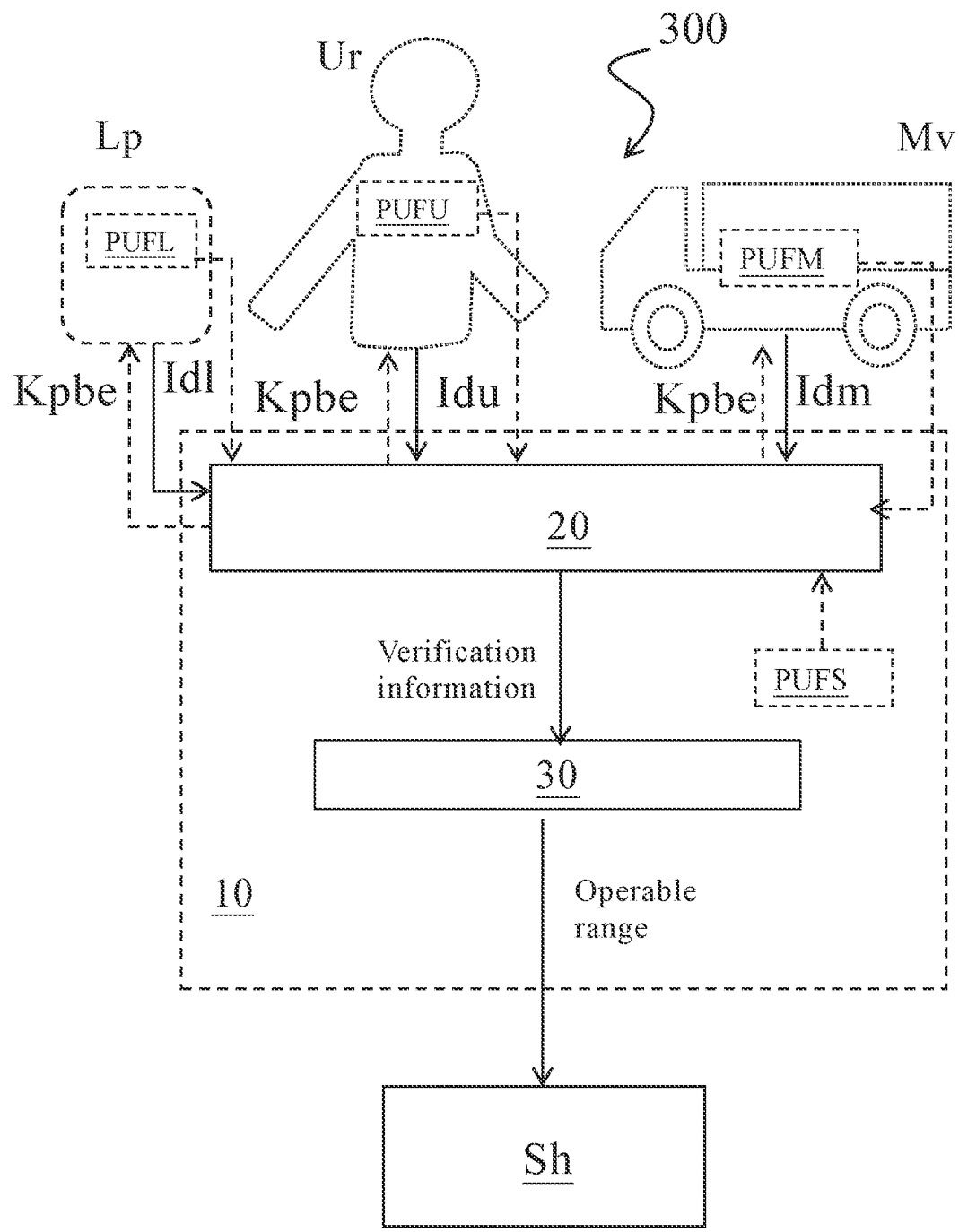

In one perspective as shown in FIG. 5, the present invention provides a sharing service encryption system 300, which includes a sharing service encryption device 10, a verification unit 20, and a sharing resource determination 30. Therein, the identity information (Idu, Idl or Idm) is encrypted according to asymmetric encryption, and the asymmetric encryption method of the present invention provides a public key encrypted by a secret key, to generate an encrypted public key Kpbe. The secret key may be generated based on at least one of the physical unclonable functions PUFU, PUFM of the user Ur and the mobile vehicle Mv, or the physical unclonable function PUFS in the shared service encryption system. When the encrypted public key Kpbe is transmitted from the sharing service encryption device 10 to the user Ur, the logistics package Lp and the mobile vehicle Mv, it is very difficult to decrypt the identity information (Idu or Idm) by illegally sniffing the encrypted public key Kpbe, which significantly increases the security of the system. Other details related to the sharing service encryption system 300, can be referred to the descriptions of other embodiments mentioned above and they are not repeated herein.

Figure 6:
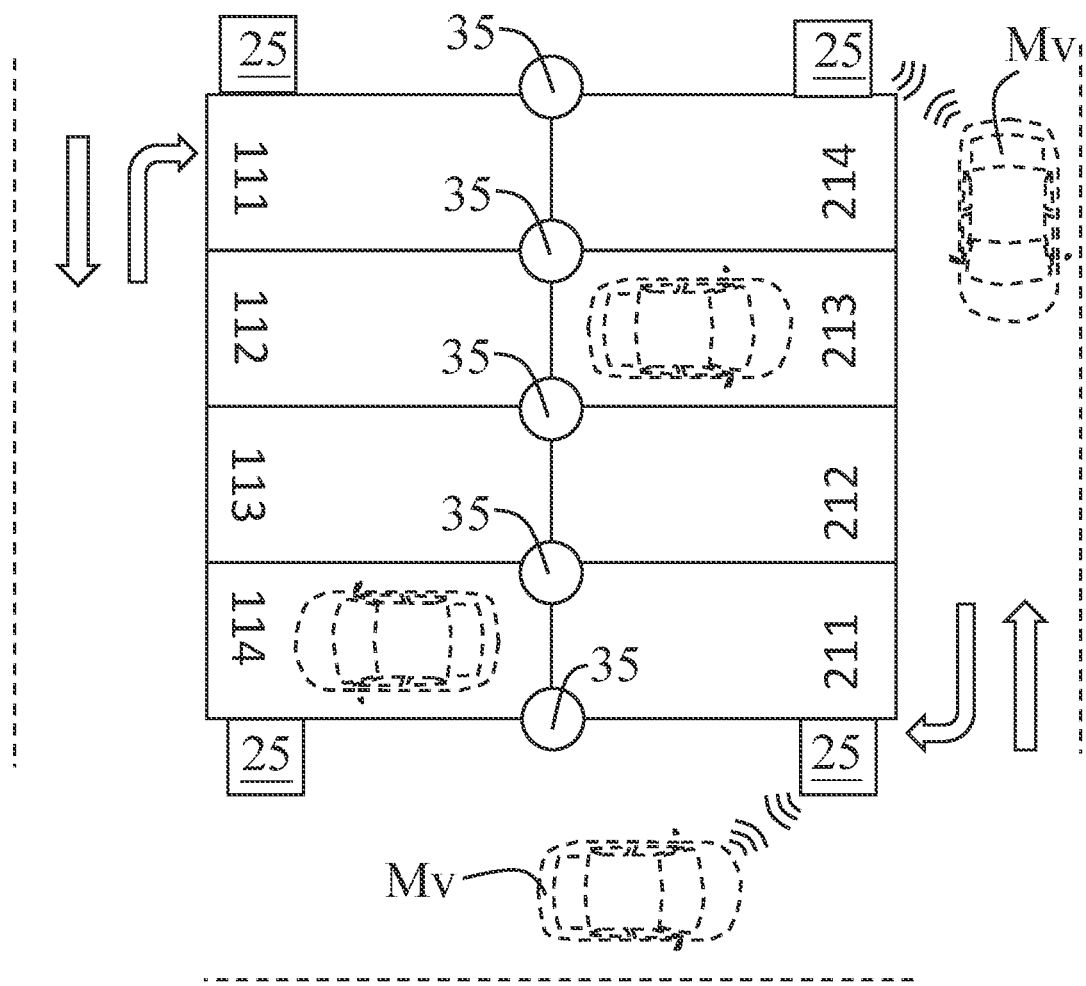
FIG. 6 shows a schematic diagram of one embodiment of a sharing resource including a parking space according to the present invention.

In the embodiment as shown in FIG. 6, the sharing resource Sh mainly includes a parking space, wherein the verification unit includes at least one wireless verification unit 25, separately located at the entrance to the parking space and each lane in the parking space, to verify the user or the mobile vehicle Mv, by means of wireless signals (e.g. Bluetooth, low power WiFi, Zigbee, WiSUN, etc.) or other transmission means. When the user or the mobile vehicle is verified, the wireless verification unit 25 generates the verification information. The sharing resource determination unit includes a smart parking pillar 35 or smart parking ground seat. The smart parking pillar 35 accepts the verification information, to determine where the user or the mobile vehicle Mv can park in the parking space, such as location marks 111 to 114, 211 to 214 in the parking space (these marks are only examples of the operable range, and the operable range can include other factors, such as parking time). Therein, when the smart parking pillar 35 accepts the verification information, the smart parking pillar 35 can indicate the operable range by various means (flashing lights, sound, displaying text, display in an app, etc.) to the user or the mobile vehicle Mv. The smart parking pillar 35 can also monitor a parking status of the mobile vehicle Mv in the parking space, and send alerts or notifications based on the parking status.

In one embodiment, when the sharing resource mainly consists of on-street parking spaces, the aforementioned wireless verification unit may be integrated into an on-street smart parking pillar to verify the user or mobile vehicle, and to determine the operable range of the user or the mobile vehicle in the on-street parking space.

In one embodiment, the sharing service encryption system 100, 200, 300, or a sharing service encryption device 10, 20, and other components thereof, may be located in a specific device. The specific device can be, for example, a server, a user interface, a microcomputer device, an electronic device, a handheld device, a cloud device, or a distributed system, etc., wherein the selection of the specific device depends on the needs of the particular device.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention.

What is claimed is:

1. A sharing service encryption system, including:
   a verification device, verifying an identity information and a physical unclonable function, to accordingly generate verification information based on the verifying result, wherein the identity information and the physical unclonable function are obtained from at least one of a user and a mobile vehicle; and
   a sharing resource determination device, determining an operable range of the at least one of the user and the mobile vehicle, to be effective in a sharing resource, based on the verification information;
   wherein the identity information is encrypted by asymmetric encryption, a public key and a current private key are provided for the asymmetric encryption, the current private key is generated based on the a physical unclonable function, and a private key tracking information of the current private key is generated with reference to an initial private key, wherein the initial private key is restored based on the current private key and the private key tracking information, and the public key is generate based on the initial private key.

2. The sharing service encryption system according to claim 1, wherein the sharing service encryption device generates a secret key based on the physical unclonable function of the at least one of the user and the mobile vehicle, or based on the physical unclonable function in the sharing service encryption system, wherein the public key of the asymmetric encryption is encrypted by the secret key.

3. The sharing service encryption system according to claim 1, wherein a digital signature of the identity information is generated based on the physical unclonable function of the at least one of the user and the mobile vehicle; or, a symmetric cryptography password of the identity information is generated based on the physical unclonable function of the at least one of the user and the mobile vehicle.

4. The sharing service encryption system according to claim 1, wherein the sharing resource including: a sharing space, a sharing support service, a sharing facility, a sharing logistics, or a sharing mobile carrier; wherein the sharing resource determination unit generates determination information based on the identity information, and determines the operable range of the at least one of the user and the mobile vehicle to be effective in the sharing resource, based on the determination information.

5. The sharing service encryption system according to claim 1, wherein the sharing resource enters a secure mode or a monitoring guidance mode, when the sharing resource has a damage state or the user using the sharing resource has a vandal behavior record.

6. The sharing service encryption system according to claim 1, wherein the sharing service encryption device, further including: a detention mode or a denial mode, wherein when the user has a potential security concern or the mobile vehicle has a potential function concern or a potential ownership concern, the sharing service encryption device activates the detention mode to hold the mobile vehicle, or activates the denial mode to prohibit the user or the mobile vehicle from using the sharing resource.

7. The sharing service encryption system according to claim 1, further including:
a user verification device, verifying the user based on the physical unclonable function and identity information of the user, to generate user verification information based on the verifying result of the user;
a package verification device, verifying a logistics package based on the physical unclonable function and identity information of the logistics package, to generate logistics verification information based on the verifying result of the logistics package;
a vehicle verification device, verifying the mobile vehicle based on the physical unclonable function and identity information of the mobile vehicle, to generate vehicle verification information based on the verifying result of the mobile vehicle; and
the sharing resource determination device, determining the operable range of at least one of the user, the logistics package and the mobile vehicle, to be effective in a sharing resource, based on at least one of the user verification information, the logistics verification information and the vehicle verification information.

8. A sharing service encryption system, including:
a verification device, verifying an identity information and a physical unclonable function, to accordingly generate verification information based on the verifying result; and
a sharing resource determination unit, determining an operable range of a user or a mobile vehicle, to be effective in a sharing resource, based on the verification information;
wherein the identity information is encrypted by asymmetric encryption, a public key and a current private key are provided for the asymmetric encryption, the current private key is generated based on the a physical unclonable function, and a private key tracking information of the current private key is generated with reference to an initial private key; and
wherein a proficiency level of the user accessing to the sharing service encryption system at least includes a beginner user and an advanced user; wherein when the user is verified to be the beginner user, the sharing service encryption system provides guide information for guiding the beginner user to use the sharing resource, wherein the mobile vehicle includes a car, locomotive, bicycle, boat, or aircraft.

* * * * *